United States Patent
Ma et al.

(10) Patent No.: US 12,061,354 B2
(45) Date of Patent: Aug. 13, 2024

(54) BACKLIGHT MODULE AND DISPLAY DEVICE

(71) Applicants: Hefei Xinsheng Optoelectronics Technology Co., Ltd., Anhui (CN); BOE Technology Group Co., Ltd., Beijing (CN)

(72) Inventors: Yong Ma, Beijing (CN); Haifeng Xu, Beijing (CN); Ran Tao, Beijing (CN); Kaiwen Wang, Beijing (CN); Jing Li, Beijing (CN)

(73) Assignees: Hefei Xinsheng Optoelectronics Technology Co., Ltd., Anhui (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/031,030

(22) PCT Filed: Jan. 4, 2021

(86) PCT No.: PCT/CN2021/070175
§ 371 (c)(1),
(2) Date: Apr. 10, 2023

(87) PCT Pub. No.: WO2022/141640
PCT Pub. Date: Jul. 7, 2022

(65) Prior Publication Data
US 2023/0375777 A1    Nov. 23, 2023

(51) Int. Cl.
*F21V 8/00*    (2006.01)
(52) U.S. Cl.
CPC .................. *G02B 6/0088* (2013.01)

(58) Field of Classification Search
CPC .................................................... G02B 6/0088
See application file for complete search history.

(56) References Cited

U.S. PATENT DOCUMENTS 6,820,992 B2 *    11/2004   Yu ........................ G02B 6/0088
                                                        362/23.15
2005/0254261 A1 * 11/2005   Lo ........................ G02B 6/0088
                                                        362/633
(Continued)

FOREIGN PATENT DOCUMENTS

CN        103207468 A       7/2013
CN        203759385 U       8/2014
(Continued)

OTHER PUBLICATIONS

English translation of Wang CN-204807865-U, published Nov. 2015 (Year: 2015).*

(Continued)

*Primary Examiner* — Evan P Dzierzynski
(74) *Attorney, Agent, or Firm* — ArentFox Schiff LLP

(57) ABSTRACT

A backlight module and a display device. The backlight module includes: a back plate, wherein the back plate has a bottom plate and a plurality of side plates, the side plates cooperate with the bottom plate to form an accommodating space, and the side of each of the side plates facing the accommodating space is provided with a groove having an opening facing the accommodating space; and a mold frame, includes bezels in one-to-one correspondence with the plurality of side plates; in each group of a side plate and a bezel, the bezel includes a clamping part, a supporting part and a limiting part, the clamping part is located at a side of the limiting part away from the accommodating space, and is embedded into the groove to clamp with the groove.

9 Claims, 6 Drawing Sheets

(56) References Cited

U.S. PATENT DOCUMENTS

| | | | |
|---|---|---|---|
| 2007/0030700 A1* | 2/2007 | Pan | G02B 6/0088 362/633 |
| 2007/0147091 A1* | 6/2007 | Ma | G02B 6/0088 362/633 |
| 2008/0297679 A1 | 12/2008 | Jung et al. | |
| 2009/0303748 A1* | 12/2009 | Lin | G02B 6/0088 362/633 |
| 2016/0041421 A1 | 2/2016 | Morioka et al. | |
| 2016/0091656 A1* | 3/2016 | Que | G02B 6/0088 362/382 |
| 2016/0139442 A1 | 5/2016 | Li et al. | |
| 2017/0199321 A1* | 7/2017 | Liu | G02B 6/0088 |
| 2021/0033912 A1 | 2/2021 | Xiao | |

FOREIGN PATENT DOCUMENTS

| | | | |
|---|---|---|---|
| CN | 204807865 U | * | 11/2015 |
| CN | 205263428 U | | 5/2016 |
| CN | 205334013 U | | 6/2016 |
| CN | 106707592 A | | 5/2017 |
| CN | 206515581 U | | 9/2017 |
| CN | 207924324 U | | 9/2018 |
| CN | 209028243 U | | 6/2019 |
| CN | 110379303 A | | 10/2019 |
| CN | 110488523 A | | 11/2019 |
| CN | 209607322 U | | 11/2019 |
| CN | 211653347 U | | 10/2020 |
| KR | 20140061061 A | | 5/2014 |

OTHER PUBLICATIONS

English Translation of Deng CN 205334013, published Jun. 22, 2016 (Year: 2016).*

Decision of Rejection in CN202180000001.4, dated Apr. 29, 2023, 6 pages.

Li, Bingqiao, "The present situation and Development Prospect of narrow frame liquid Crystal display Technology," Electronic Test, Aug. 2019, 6 pages.

Office Action in CN202180000001.4, dated Nov. 1, 2022, 7 pages.

International Search Report for PCT/CN2021/070175 dated Sep. 15, 2021.

* cited by examiner

BACKLIGHT MODULE AND DISPLAY DEVICE

CROSS REFERENCE TO RELATED APPLICATIONS

The present disclosure is a national phase entry under 35 U.S.C § 371 of International Application No. PCT/CN2021/070175, filed Jan. 4, 2021, and entitled "BACKLIGHT MODULE AND DISPLAY DEVICE".

FIELD

The present application relates to the technical field of display, in particular to a backlight module and a display device.

BACKGROUND

With the development of the vehicle-mounted technology, the vehicle-mounted backlight is now being increasingly applied to a die-cast aluminum structure. Compared with a common aluminum backplane structure, the die-cast aluminum backplane has better heat dissipation and higher strength, and can be designed to be in a more complex outline structure.

However, the die-cast aluminum wall is thick, and in the current commonly used die-cast aluminum backlight structure, a mold frame is internally clamped in a backplane, and a side wall needs to extend from the backplane to support the mold frame so as to prevent the mold frame from turning inwards. It is also necessary to ensure a certain space between a light guide plate and the mold frame to accommodate the expansion of the light guide plate and a diaphragm, so that a bezel of the module with the die-cast aluminum structure is generally large.

SUMMARY

The present application provides a backlight module to solve the problem of a large bezel with a die-cast aluminum structure in the prior art.

In order to achieve the above objective, the present application provides a backlight module, including:
  a backplane, provided with a bottom plate and a plurality of side plates; the side plates cooperate with the bottom plate to form an accommodating space, a side of each side plate facing the accommodating space is provided with a groove having an opening facing towards the accommodating space;
  a mold frame, including bezels in one-to-one correspondence with the plurality of side plates; in each set of the side plate and the bezel, the bezel includes a clamping part, a support part, and a limiting part; the clamping part is located on a side of the limiting part away from the accommodating space, and is embedded in the groove to be clamped to the groove; the support part is located at a side of a light guide plate placed in the accommodating space facing away from the bottom plate, and a side of the support part facing away from the light guide plate has a support surface; the limiting part is located at a side of the support part facing away from the light guide plate; and a side of the limiting part facing towards the accommodating space has a limiting surface, and the limiting surface is perpendicular to the support surface.

In the above backlight module, a side of each of the side plates in the backplane facing the accommodating space is provided with the groove having the opening facing the accommodating space. The mold frame includes the bezels in one-to-one correspondence with the side plates, the clamping parts of the bezels are embedded in the grooves to be clamped with the grooves, to prevent the mold frame from tripping upwards and turning inwards. Moreover, the parts of the mold frame protruding from the grooves form the limiting part for limiting the movement of the panel and the support part for supporting the panel. The support part is located at a side of the light guide plate facing away from the bottom plate. The side of the support part facing away from the light guide plate has the support surface for supporting the panel. The side of the limiting part facing towards the accommodating space has the support surface for limiting the movement of the panel. Each of the bezels of the mold frame is clamped onto the corresponding side plate to prevent each of the bezels from turning inwards or tripping upwards while playing a role in fixing the mold frame. Since the bezels are located above the light guide plate and there is no overlap between the bezels and the light guide plate in a height direction of the side plates, the side wall for supporting the mold frame can be omitted. Compared with the bezel of the module in the prior art, the backlight module in the present application can reduce the size of the bezel of the module, thereby achieving the effect of a narrow bezel.

Therefore, the backlight module in the present application adopts the mold frame with an internal clamping structure, which does not need to be inserted between the light guide plate and the backplane, thereby solving the problem of the large bezel of the module with the die-cast aluminum structure in the prior art.

Preferably, among a side surface of the side plate facing the accommodating space, an upper side surface located at an upper part of the groove is on a side, facing away from the accommodating space, of a lower side surface located at a lower part of the groove in a thickness direction of the side plate.

Preferably, the side plate has a support surface for bearing the support part, and a width of the support surface is greater than 1 mm in the thickness direction of the side plate.

Preferably, a side, facing the bottom plate, of a portion of the bezel clamped to the groove is provided with a guide surface.

Preferably, a side edge of the groove facing the bottom plate is higher than the support surface such that the support surface and the side edge of the groove facing the bottom plate form a step structure.

Preferably, a height of the groove is 1.45-1.55 mm.

Preferably, a width of the groove is 0.7-1.8 mm in the thickness direction of the side plate.

Preferably, the backlight module further includes a light guide plate, a reflective sheet, and a diaphragm disposed in the accommodating space, as well as a panel and a cover plate disposed on the support part in sequence; an adhesive layer is disposed between the cover plate and the side plate to adhere the cover plate and the side plate.

Preferably, a surface of the side plate facing towards the cover plate forms a support surface; an orthographic projection of the adhesive layer on the support surface is located in the support surface, a width of the orthographic projection of the adhesive layer is greater than 2 mm in the thickness direction of the side plate, a distance between an inner edge of the orthographic projection of the adhesive layer and an inner edge of the support surface is 0.18-0.21 mm, and a distance between an outer edge of the orthographic projection of the adhesive layer and an outer edge of the support surface is 0.18-0.21 mm.

Preferably, at least one side plate among the plurality of side plates included in the backplane has a different number of grooves from the other side plates of the plurality of side plates.

Preferably, the present application also provides a display device, including the any one of the above backlight modules.

Figure 1:
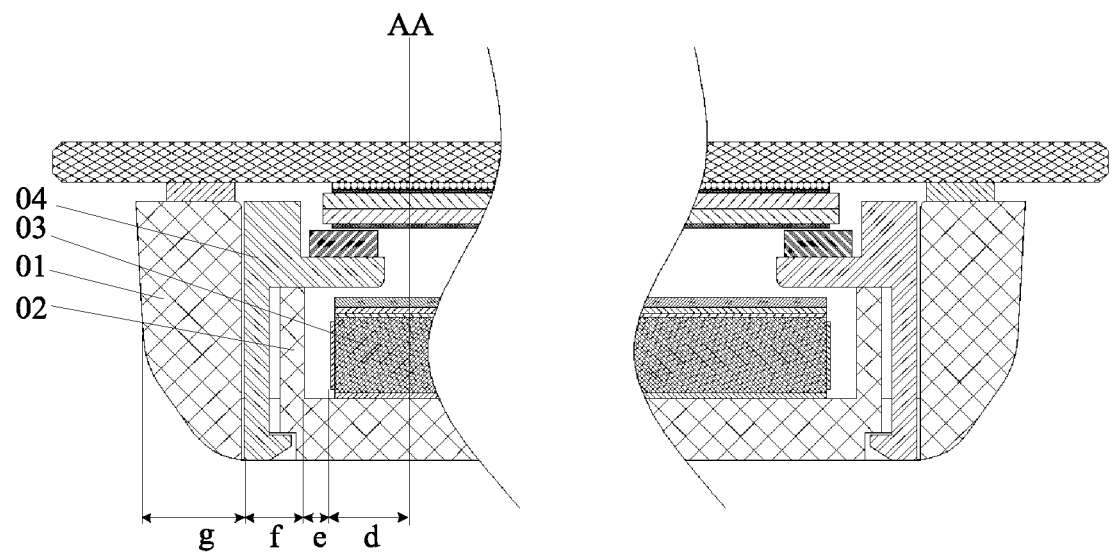
FIG. 1 is a schematic diagram of a cross-sectional structure of a backlight module in the prior art.
Figure 2:
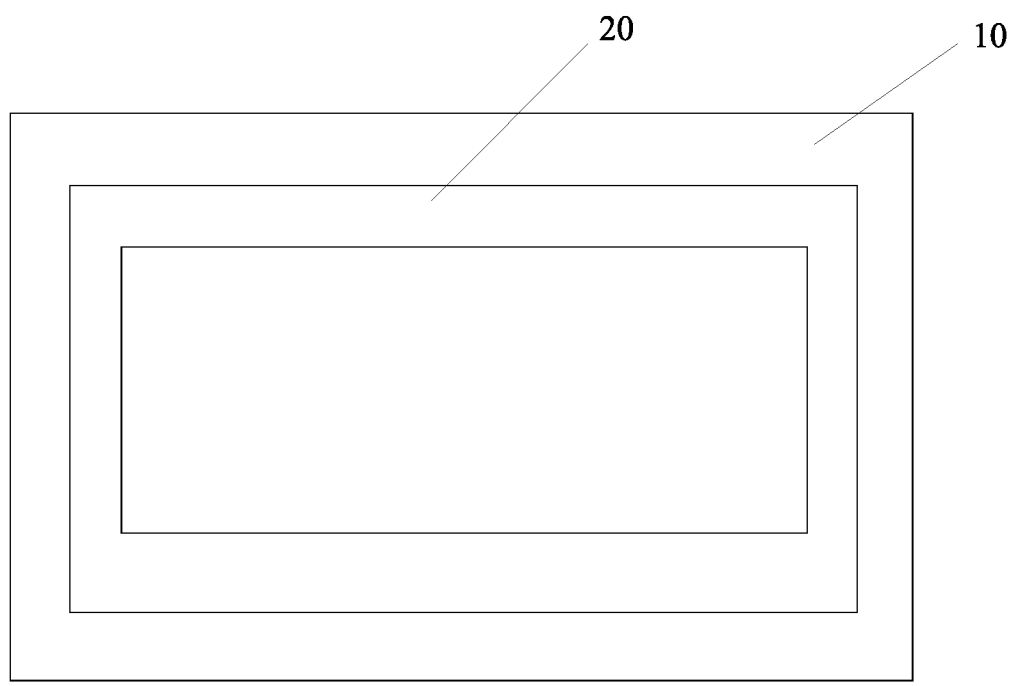
FIG. 2 is an overall schematic structural diagram of a backlight module in the present application.

In the drawings:
01—backplane; 02—side wall; 03—light guide plate; 04—mold frame; 10—backplane; 11—bottom plate; 12—side plate; 121—groove; 122—support surface; 20—mold frame; 21—bezel; 211—limiting part; 2111—limiting surface; 212—support part; 2121—support surface; 213—clamping part; 214—guide surface; 30—light guide plate; 40—reflective sheet; 50—diaphragm; 60—foam; 70—panel; 80—cover plate; 90—adhesive layer.

DETAILED DESCRIPTION OF THE EMBODIMENTS

The technical solutions in embodiments of the present application will now be clearly and completely described in conjunction with the accompanying drawings in the embodiments of the present application. It will be apparent that the described embodiments are only some, but not all, embodiments of the present application. Based on the embodiments of the present invention, all other embodiments obtained by a person of ordinary skill in the art without inventive step are within the scope of protection of the present invention.

As shown in FIG. 1, in the prior art, a current commonly used die-cast aluminum backlight structure is as follows: a mold frame 04 is internally clamped in a backplane 01, and a side wall 02 extends from the backplane 01 to support the mold frame 04 so as to prevent the mold frame 04 from turning inwards. Moreover, it is also necessary to ensure a certain space between a light guide plate 03 and the mold frame 04 to accommodate the expansion of the light guide plate 03 and a diaphragm. When the light guide plate 03 exceeds an AA regional part by the distance d, a gap between the light guide plate 03 and the backplane 01 is e, the distance between an inner side of a support wall of the backplane 01 and an inner side of the side wall 02 is f, and the thickness of a side wall of the backplane 01 is g, the thickness of the bezel of the module is d+e+f+g, and is large, which is not advantageous for realizing the effect of a narrow bezel.

In view of this, with reference to FIGS. 2-6, the present application may provide a backlight module, including a backplane 10 and a mold frame 20. The backplane 10 is provided with a bottom plate 11 and a plurality of side plates 12 cooperating with the bottom plate 11 to form an accommodating space. a side of each of the side plates 12 facing the accommodating space is provided with a groove 121 having an opening facing towards the accommodating space. The mold frame 20 includes bezels 21 in one-to-one correspondence with the side plates 12. In each group of the corresponding side plate 12 and bezel 21, the bezel 21 includes a limiting part 211, a support part 212, and a clamping part 213. The clamping part 213 is embedded in the groove 121 to be clamped with the groove 121, and a part of the bezel 21 protruding from the groove 121 form the limiting part 211 for limiting the movement of a panel 70 placed in the accommodating space, and the support part 212 for bearing the panel 70.

Figure 6:
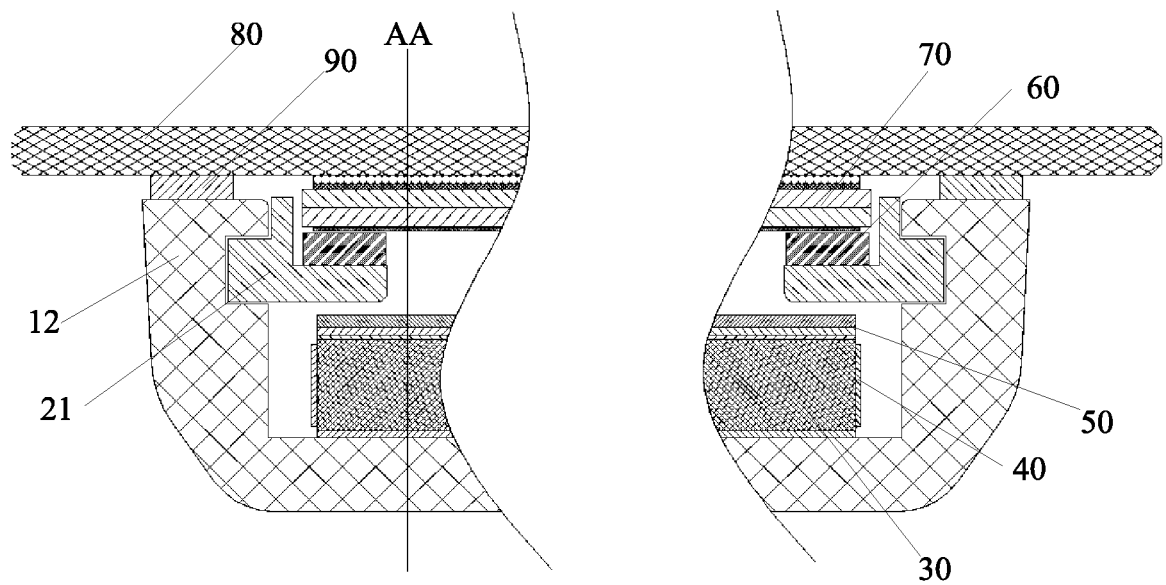
FIG. 6 is a schematic diagram of a cross-sectional structure of a backlight module in the present application.

With continued reference to FIG. 6, the backlight module further includes a light guide plate 30, a reflective sheet 40, and a diaphragm 50 disposed in the accommodating space, and further includes a panel 70 and a cover plate 80 on the support part 212 formed by the bezel 21. The support part 212 is located on a side of the light guide plate 30 facing away from the bottom plate 11, and a support surface 2121 is formed at a side of the support part 212 facing away from the light guide plate 30 to support the panel 70. The limiting part 211 is located at a side of the support part 212 facing away from the light guide plate 30, and a limiting surface 2111 is formed at a side the limiting part 211 facing the accommodating space to limit the movement of the panel 70, and the limiting surface 2111 is perpendicular to the support surface 2121.

In the above backlight module, the side of each of the side plates 12 in the backplane facing the accommodating space is provided with the groove 121 having the opening facing the accommodating space. The mold frame 20 includes bezels 21 in one-to-one correspondence with the side plates 12, the clamping parts 213 of the bezels 21 are embedded in the grooves 121 to prevent the mold frame 20 from tripping upwards and turning inwards. Moreover, a part of the mold frame 20 protruding from the groove 121 forms the limiting part 211 for limiting the movement of the panel 70 and the support part 212 for supporting the panel 70. The support part 212 is located at a side of the light guide plate 30 facing away from the bottom plate 11. The side of the support part 212 facing away from the light guide plate 30 has the support surface 2121 for supporting the panel 70. The side of the limiting part 211 facing the accommodating space has the limiting surface 2111 for limiting the movement of the panel 70. Each of the bezels 21 of the mold frame 20 is clamped onto the corresponding side plate 12 to prevent each of the bezels 21 from turning inwards or tripping upwards while playing a role in fixing the mold frame 20. Since the bezels 21 are located above the light guide plate 30 and there is no overlap between the bezels 21 and the light guide plate 30 in a height direction of the side plates 12, the side wall for supporting the mold frame 20 can be omitted. Compared with the bezel of the module in the prior art, the backlight module in the present application can reduce the size of the bezel of the module, thereby achieving the effect of a narrow bezel.

In the present application, the grooves 121 are formed in the backplane 10 and the clamping parts 213 of the bezels 21 are embedded in the grooves 121 to play a role in preventing the mold frame 20 from tripping upwards and turning inwards. Compared with the technical solution in the prior art that the side wall extends from the backplane 10 to support the mold frame 20, the technical solution in the present application can effectively reduce the size of the bezel of the module.

Figure 9:
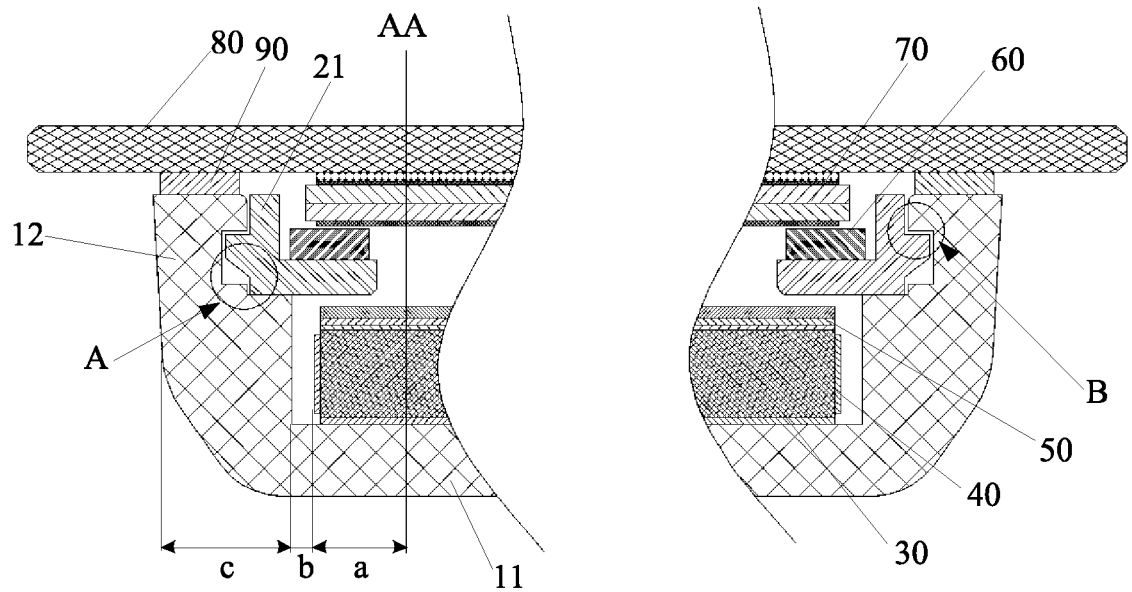
FIG. 9 is a schematic diagram of a cross-sectional structure of a backlight module in the present application.

As shown in FIG. 9, the backlight module in the present application has a bezel thickness a+b+c when the light guide plate 30 exceeds the AA regional part by the distance a, and the distance between the light guide plate 30 and the side plate 12 is b, and the thickness of the side plate 12 is c. Meanwhile, compared with FIG. 1 showing the structure of the backlight module in the prior art, the structure in the present application has the approximate omission of the thickness f of the side wall for supporting the mold frame in FIG. 1, compared to the prior art.

Figure 5:
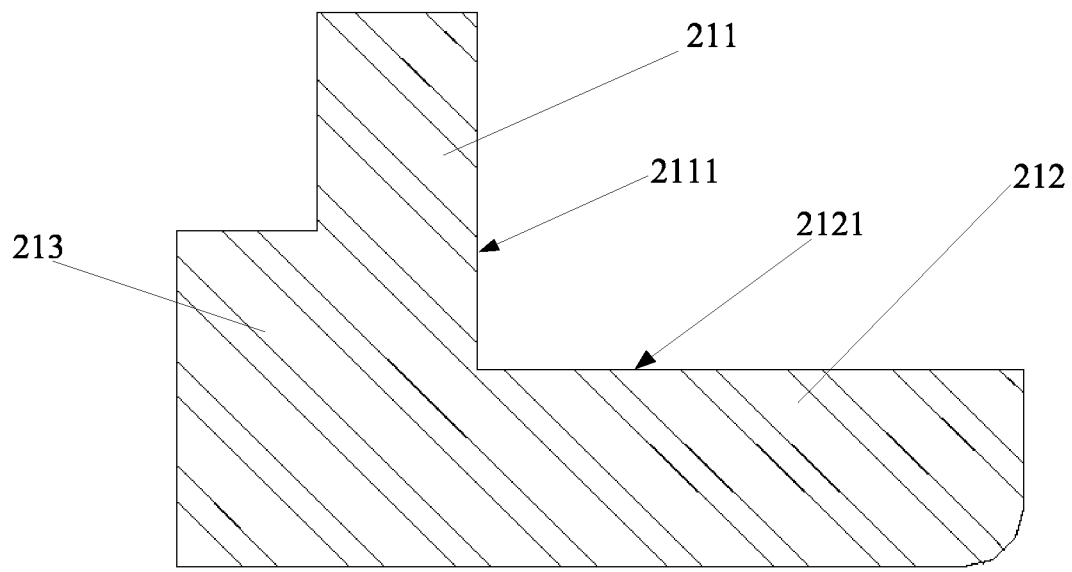
FIG. 5 is a schematic diagram of a cross-sectional structure of a bezel in the present application.

In an embodiment, as shown in FIG. 5, in each group of the side plate 12 and bezel 21 in the backlight module of the present application, the bezel 21 has an overall convex structure, that is, a bottom surface of the groove 121 formed in the side plate 12 coincides with a bottom surface of the bezel 21, the clamping part 213 fits with the groove 121 in shape, and a bottom surface of the clamping part 213 coincides with a bottom surface of the support part 212. When the clamping part 213 is inserted into the groove 121, the bottom of the clamping part 213 abuts against the bottom of the groove 121 to support the bezel 21 so as to prevent the bezel 21 from sinking. An upper end surface of the clamping part 213 may be contact with an upper end surface of the groove 121 to prevent the bezel 21 from tripping upwards and turning inwards. Meanwhile, a side surface of the clamping part 213 contacts with a side surface of the groove 121. Moreover, as shown in FIG. 6, at this time, an upper side surface, facing the accommodating space, of the side plate 12 located at an upper part of the groove 121 is flush with a lower side surface, facing the accommodating space, of the side plate 12 located at a lower part of the groove 121 in the height direction of the side plate 12. One of two side surfaces of the limiting part 211 for limiting the panel 70 is attached to the upper side surface of the side plate facing the accommodating space, and the other side surface facing the panel 70 is located between the panel 70 and the upper side surface of the side plate facing the accommodating space in the height direction of the side plate 12.

It should be noted that in the above embodiments, in order to facilitate the placement of panel 70 after placing foam 60 on the support part 212, the upper end surface of the support part 212 may be lower than the upper end surface of the clamping part 213 so as to adapt to the structure of the entire module. Moreover, in order to facilitate better adhesion between the bezel 21 and the side plate 12, the width of the clamping part 213 is slightly smaller than the width of the groove 121 in the thickness direction of the side plate 12. Meanwhile, in order to sufficiently support the bezel 21 to prevent the bezel 21 from sinking, the width of the groove 121 may be set to be 0.7-1.8 mm at this time, and in order to ensure the clamping effect of the bezel 21 and the groove 121, the width of the above groove 121 may be set to be about 1 mm as a preferred embodiment.

Figure 4:
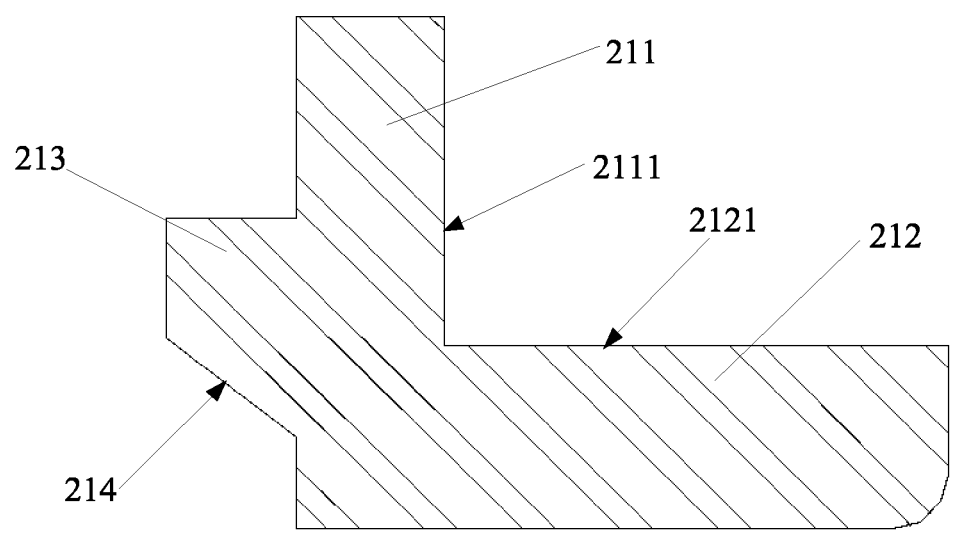
FIG. 4 is a schematic diagram of a cross-sectional structure of a bezel in the present application.
Figure 7:
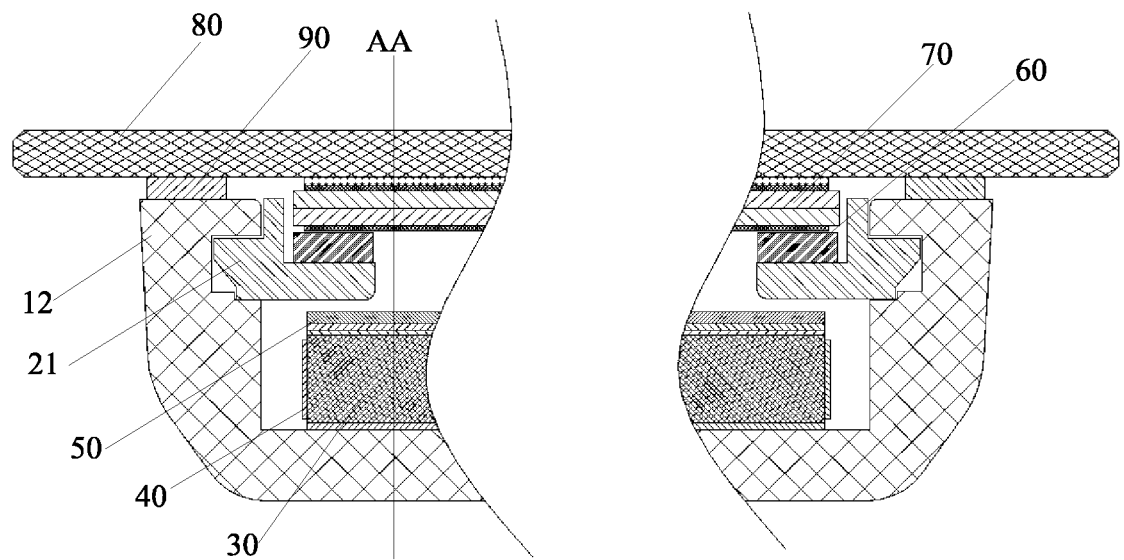
FIG. 7 is a schematic diagram of a cross-sectional structure of a backlight module in the present application.

Based on the embodiments, as shown in FIG. 4, in order to facilitate the installation of the mold frame 20, a guide surface 214 may be provided at a side of the clamping part 213 facing the bottom plate 11. As shown in FIG. 7, the bezel 21 can easily pass through the top of the side plate 12 to be embedded into the groove 121 under the action of the guide surface 214 when the mold frame 20 is pressed from the top to the bottom due to the material of the mold frame 20 is soft. In an implementation mode, the guide surface 214 is planar and forms a certain angle with a main body of the clamping part 213 such that the clamping part 213 has a trapezoidal structure. At this time, a lower end surface of the groove 121 may be made to be of a stepped structure to match the structure of the bezel 21, and can be not only used to support the bezel 21 but also to better limit the movement of the bezel 21.

Figure 3:
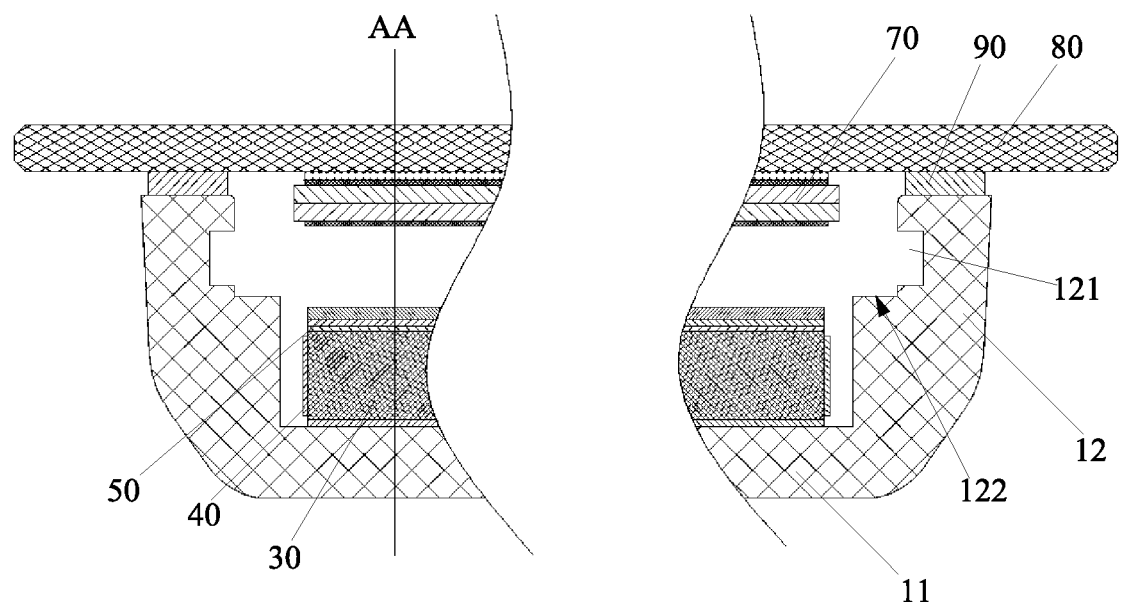
FIG. 3 is a schematic diagram of a cross-sectional structure of a backlight module without a mold frame in the present application.
Figure 8:
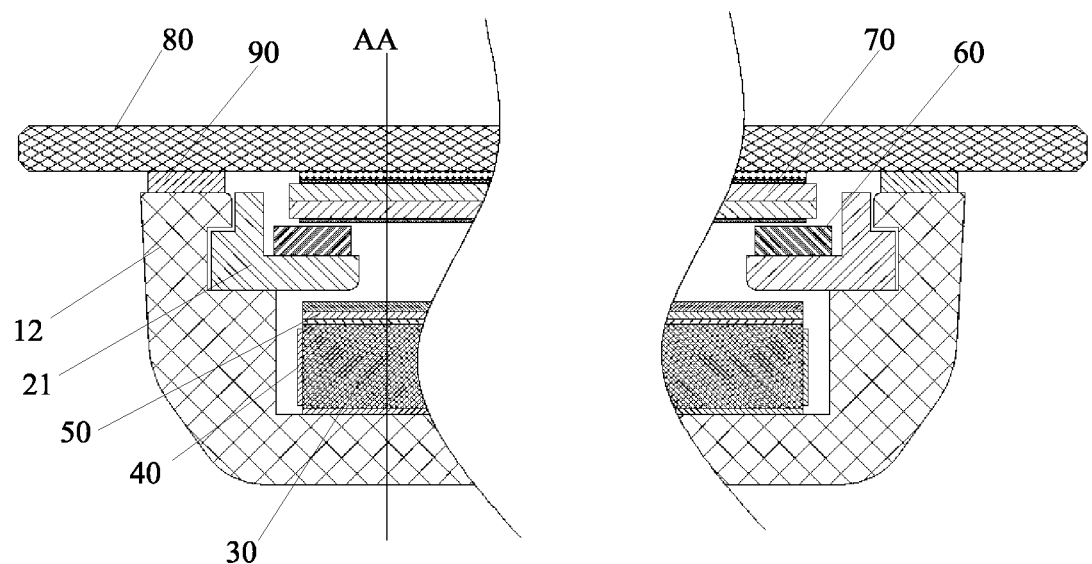
FIG. 8 is schematic diagram of a cross-sectional structure of a backlight module in the present application.
Figure 11:
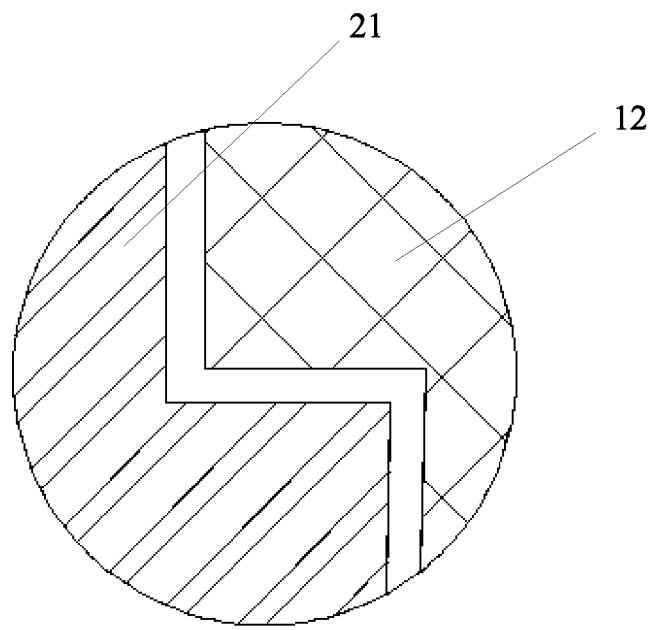
FIG. 11 is an enlarged view of a structure at a location B in FIG. 9.

In an embodiment, as shown in FIGS. 3, 8 and 11, as described in the previous embodiments, the bezel 21 is a convex structure, and a lower end surface of the clamping part 213 coincides with the lower end surface of the groove 121 and is flush with a lower end surface of the support part 212. Moreover, among a side surface of the side plate 12 facing the accommodating space, an upper side surface located at the upper part of the groove 121 is on a side of a lower side surface located at the lower part of the groove 121 away from the light guide plate 30 in the height direction of the side plate 12, and the side surface of the limiting part 211 facing the accommodating space is located between the upper side surface of the side surface of the side plate 12 and the lower side surface of the side surface of the side plate 12 when the bezel 21 is clamped into the groove 121. At this time, a side of the side plate 12 facing towards the panel 70 is provided with a support surface 122 for bearing the support part 212, and a width of the support surface 122 is at least greater than 1 mm, and the support surface 122 is used for supporting the mold frame 20 to prevent the mold frame 20 from sinking. When the clamping part 213 is embedded into the groove 121, the upper end surface of the clamping part 213 is in contact with the upper end surface of the groove 121 to prevent the mold frame 20 from tripping upwards and turning inwards. The above structure can ensure that when the mold frame 20 is installed on the backplane 10, a certain space is guaranteed between the structures, meanwhile, the thickness of the bezel of the backlight module can be reduced, and the installation of the mold frame 20 is facilitated.

It should be noted that the height of the above groove 121 may be selected to be about 1.5 mm, and it is ensured that the bottom surface of the support part 212 may be higher than the light guide plate 30 in the height direction of the side plate 12.

On this basis, as shown in FIG. 9, the guide surface 214 may be formed at a side of the clamping part 213 facing the bottom plate 11 to facilitate the installation of the mold frame 20. The bezel 21 can easily pass through the top of the side plate 12 to be embedded into the groove 121 under the action of the guide surface 214 when the mold frame 20 is pressed from the top to the bottom due to the material of the mold frame 20 is soft. Furthermore, the guide surface 214 may be planar and forms a certain angle with the main body of the clamping part 213 such that the clamping part 213 has a trapezoidal structure.

It should be noted that when the guide surface 214 is disposed, it needs to be ensured that the height of the side surface of the clamping part 213 contacted with the side surface of the groove 121 facing the accommodating space is about 0.5 mm, to secure the clamping effect of the clamping part 213 and the bezel 21. Meanwhile, the width of the groove 121 is 0.65-0.75 mm in the thickness direction of the side plate 12 to ensure that the upper end surface of the groove 121 is in sufficient contact with the upper end surface of the clamping part 213, thereby ensuring the clamping effect on the clamping part 213 to prevent the mold frame 20 from tripping upwards and turning inwards.

Figure 10:
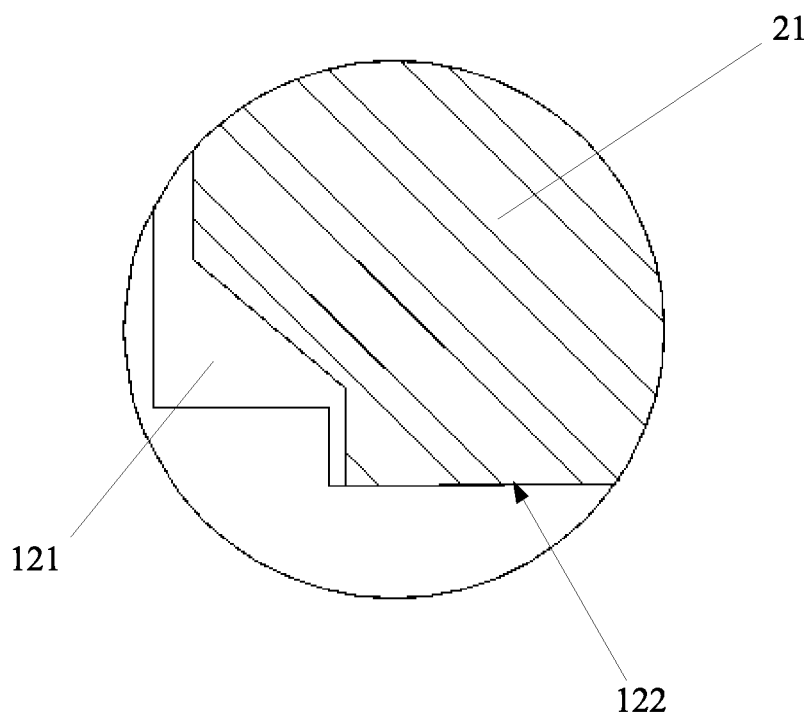
FIG. 10 is an enlarged view of a structure at a location A in FIG. 9.

It should be noted that in the embodiments, as shown in FIG. 10, when the guide surface 214 is provided for the clamping part 213, the lower end surface of the groove 121 may be higher than the support surface 122 so that a step is formed between the groove 121 and the support surface 122. The step structure may facilitate better fixing of the bezel 21 when the clamping part 213 is clamped into the groove 121. The height of the step may be determined based on the size of the guide surface 214.

As shown in FIG. 9, according to the backlight module of the present application, a layer of foam 60 is disposed between the mold frame 20 and the panel 70 when the panel 70 is installed on the mold frame 20, to cushion the panel 70, thereby better protecting the panel 70.

It also should be noted that, when the mold frame 20 is fixed by the groove 121 formed in the side plate 12, the width of the side surface of the side plate 12 facing the cover plate 80 needs to be designed. With reference to FIG. 9, an adhesive layer 90 is disposed between the cover plate 80 and the side plate 12 such that the cover plate 80 is adhered to the side plate 12 through the adhesive layer 90. The width of the adhesive layer 90 in the thickness direction of the side plate 12 needs to be at least greater than 2 mm to guarantee a sufficient adhesion effect of the cover plate 80 and the side plate 12, thereby guaranteeing that the cover plate 80 is better adhered to the side plate 12. Meanwhile, with continued reference to FIG. 9, the surface of the side plate 12 facing the cover plate 80 forms a support surface for supporting the adhesive layer 90. An orthographic projection of the adhesive layer 90 on the support surface is located in the support surface, and a distance between the outer edge of the orthographic projection of the adhesive layer and the outer edge of the support surface is about 0.2 mm, that is, compared with an end surface of a side of the side plate 12 away from the panel 70, an end surface of a side of the adhesive layer 90 away from the panel 70 needs to be retracted about 0.2 mm in the direction towards the panel 70, so as to guarantee the adhesion effect of the adhesive layer 90. Similarly, it is also possible to set the distance between the inner edge of the orthographic projection of the adhesive layer 90 and the inner edge of the support surface to be about 0.2 mm, that is, compared with an end surface of a side of the side plate 12 facing the panel 70, an end surface of a side of the adhesive layer 90 facing the panel 70 also needs to retracted about 0.2 mm in a direction away from the panel 70, to guarantee the adhesive effect of the adhesion layer 90.

Figure 12:
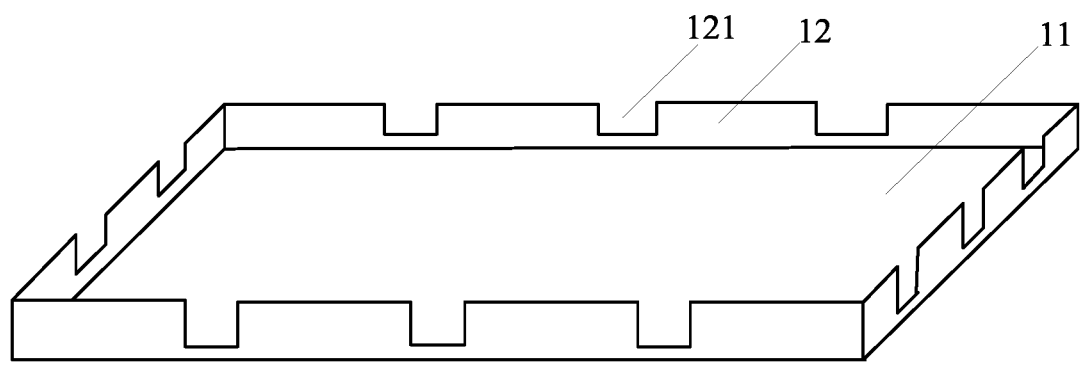
FIG. 12 is a schematic structural diagram of a backplane in the present application.

In some embodiments, as shown in FIG. 12, at least one side plate 12 of the plurality of side plates 12 included in the backplane 10 has a different number of grooves 121 from the other side plates 12 of the plurality of side plates 12. Due to the above structure, the mold frame can be prevented from misalignment when in installation, thereby improving the installation accuracy of the mold frame 20.

Based on the same inventive concept, the present application can also provide a display device including the backlight module provided by the present application, which can achieve the effect of a narrow bezel since the backlight module in the present application can effectively reduce the thickness of the bezel of the module.

Obviously, those skilled in the art can perform various modifications and variations to the embodiments of the present application without departing from the spirit and scope of the application. Thus, the present application intends to include these modifications and variations if these modifications and variations fall within the scope of the claims and equivalent technologies thereof.

What is claimed is:

1. A backlight module, comprising:
   a backplane, provided with a bottom plate and a plurality of side plates, wherein the side plates cooperate with the bottom plate to form an accommodating space, a side of each side plate facing the accommodating space is provided with a groove having an opening facing towards the accommodating space; and
   a mold frame, comprising bezels in one-to-one correspondence with the plurality of side plates, wherein for each group of the side plate and the bezel, the bezel comprises a clamping part, a support part, and a limiting part; the clamping part is located at a side of the limiting part away from the accommodating space, and is embedded in the groove to be clamped to the groove; the support part is located at a side of a light guide plate placed in the accommodating space facing away from the bottom plate, and a side of the support part facing away from the light guide plate has a support surface; the limiting part is located at a side of the support part facing away from the light guide plate; and a side of the limiting part facing the accommodating space has a limiting surface, and the limiting surface is perpendicular to the support surface;
   wherein the side plate has a support surface for bearing the support part, and a width of the support surface is greater than 1 mm in a thickness direction of the side plate;
   a side surface of the side plate facing the accommodating space comprises:
      an upper side surface at an upper part of the groove along a height direction of the side plate; and
      a lower side surface at a lower part of the groove along the height direction of the side plate;
      wherein the upper side surface is on a side, facing away from the accommodating space, of the lower side surface in the thickness direction of the side plate.

2. The backlight module according to claim 1, wherein a side, facing the bottom plate, of a portion of the bezel clamped to the groove is provided with a guide surface.

3. The backlight module according to claim 2, wherein a surface of the groove close to the bottom plate is higher than the support surface to form a step structure.

4. The backlight module according to claim 1, wherein a height of the groove is 1.45-1.55 mm.

5. The backlight module according to claim 1, wherein a width of the groove is 0.7-1.8 mm in the thickness direction of the side plate.

6. The backlight module according to claim 1, further comprising:
   a light guide plate, a reflective sheet and a diaphragm disposed in the accommodating space; and
   a panel and a cover plate disposed on the support part in sequence, wherein an adhesive layer is disposed between the cover plate and the side plate to adhere the cover plate and the side plate.

7. The backlight module according to claim 6, wherein a surface of the side plate facing the cover plate forms a support surface; an orthographic projection of the adhesive layer on the support surface is located in the support surface, a width of the orthographic projection of the adhesive layer is greater than 2 mm in the thickness direction of the side plate, a distance between an inner edge, close to the accommodating space, of the orthographic projection of the adhesive layer and an inner edge, close to the accommodating space, of the support surface is 0.18-0.21 mm, and a distance between an outer edge, away from the accommodating space, of the orthographic projection of the adhesive layer and an outer edge, away from the accommodating space, of the support surface is 0.18-0.21 mm.

8. The backlight module according to claim 1, wherein at least one side plate among the plurality of side plates comprised in the backplane has a different number of grooves from other side plates of the plurality of side plates.

9. A display device, comprising the backlight module according to claim 1.

\* \* \* \* \*